United States Patent [19]

Shetty et al.

[11] Patent Number: 5,527,431
[45] Date of Patent: Jun. 18, 1996

[54] SILICON POLYELECTROLYTES FOR PITCH DEPOSIT CONTROL

[75] Inventors: Chandrashekar S. Shetty; Manian Ramesh, both of Lisle, Ill.

[73] Assignee: Nalco Chemical Company, Naperville, Ill.

[21] Appl. No.: 485,756

[22] Filed: Jun. 7, 1995

Related U.S. Application Data

[62] Division of Ser. No. 147,877, Nov. 4, 1993, Pat. No. 5,510,439.

[51] Int. Cl.$^6$ ................................................. D21H 21/02
[52] U.S. Cl. .................... 162/164.4; 162/168.1; 162/168.2; 162/199; 162/DIG. 4
[58] Field of Search .................... 162/164.1, 164.4, 162/164.6, 168.1, 168.2, 168.3, 199, DIG. 4

[56] References Cited

U.S. PATENT DOCUMENTS

| | | | |
|---|---|---|---|
| 4,913,775 | 4/1990 | Langley et al. | 162/164.3 |
| 4,964,955 | 10/1990 | Lamar et al. | 162/164.6 |
| 5,246,547 | 9/1993 | Finck et al. | 162/164.6 |

OTHER PUBLICATIONS

Surfactant Science and Technology, D. Myers, 1988, VCH Pub., Inc., p. 194.

*Primary Examiner*—Peter Chin
*Attorney, Agent, or Firm*—Robert A. Miller; James J. Drake; Patricia A. Charlier

[57] ABSTRACT

A method for controlling pitch in papermaking systems which comprises the step of adding a water-soluble, silicon-containing polyelectrolyte copolymer coagulant to pulp and paper process water. The water-soluble, silicon-containing polyelectrolyte copolymer coagulant preferably comprises diallyldimethyl ammonium chloride and a vinyl alkoxysilane.

8 Claims, 6 Drawing Sheets

SILICON POLYELECTROLYTES FOR PITCH DEPOSIT CONTROL

This application is a divisional application of Ser. No. 08/147,877 filed Nov. 4, 1993, now U.S. Pat. No. 5,510,439, entitled *Silicon Polyelectrolytes for Pitch Deposit Control* by Chandrashekar S. Shetty and Manian Ramesh.

The present invention relates generally to the use of a novel water-soluble silicon-containing polyelectrolyte copolymer as a coagulant for the control of pitch in pulp and paper mills. The water-soluble silicon-containing polyelectrolyte copolymer coagulant preferably comprises diallyldimethyl ammonium chloride and a vinyl alkoxysilane.

BACKGROUND OF THE INVENTION

Pitch in a papermaking system can be simply defined as the sticky, resinous material that is released from wood during the pulping process. In paper mill process waters, pitch exists as an unstable, colloidal dispersion of hydrophobic particles. Under the conditions often encountered in a papermaking system, such as hydrodynamic and mechanical shear forces, abrupt pH and temperature changes and exposure to water hardness ions and inorganic scale deposits, colloidal pitch particles tend to agglomerate and deposit on paper machine surfaces.

Pitch deposits often lead to quality defects in the finished paper product, shortened equipment life, impaired system operation, paper machine downtime and, ultimately, lost profits for the mill. These problems are magnified when a paper mill "closes up" its process water system, as many mills have already done for conservation and environmental reasons, thus eliminating many potential exit points for pitch in the system. A closed, recirculating papermaking process water system only has a limited holding capacity for hydrophobic materials like pitch. Unless these pitch particles are continuously removed from the system in a controlled manner, spontaneous system purges can occur which lead to pitch deposits and runability problems. Thus, the control of pitch deposition in a papermaking system is a priority for many papermakers.

A number of pitch deposit control methods are used in the paper industry. For example, optimizing the performance of the pulp washing stages (e.g., kraft brown stock washers and bleach plant extraction stages) through the application of pitch dispersants and defoamers or washaids to these stages is a control option for many mills. The removal of pitch through these viable exit points is especially important in closed papermaking systems. The use of pitch adsorbants such as talc are often employed; however, unless the talc/pitch particles are effectively retained in the paper sheet, talc can end up contributing to, rather than solving, the pitch deposit problem.

Alum is a widely used pitch control agent for acid papermaking systems. It acts by attaching pitch particles to fibers in a manner analogous to the setting of rosin size. Cationic coagulants promote the attachment of the anionically charged, colloidal pitch particles to fibers and fines through a charge neutralization mechanism. The advantage to using cationic coagulants and alum for pitch control is that pitch is removed from the system in the form of microscopic particles dispersed among the fibers in the finished paper product. Unlike alum, a polymer's cationic charge is not necessarily dependent on the pH of the system, thus cationic polymers can be used effectively in neutral and alkaline paper machines. In addition, cationic polymers remain soluble under normal alkaline papermaking conditions while alum can form insoluble aluminum hydroxide.

It is commonly thought that cationic polymer retention aids act purely by charge neutralization to allow the anionic pitch to deposit on the anionic wood fiber instead of the hydrophobic plastic surface of the headbox and other papermaking machine parts. Pitch is typically formed from fatty acids, sterols, fatty alcohols, alkylesters, and fatty triglycerides. Pitch is released from wood by both chemical and mechanical processing. Colloidal pitch is generated during chemical pulping, during refining and beating operations, and in minor amounts at various stages of pulp bleaching.

Pitch is considered as a dilute oil-in-water emulsion, stabilized in part by the surfactants (e.g., fatty and resin acids in their ionized forms) generated during the papermaking process. Chemicals added during processing can also contribute to the stabilization of this emulsion. Representative particle size distribution of the colloidal pitch in unbleached kraft, sulfite and groundwood pulps is found to be in the range of 0.2 to 2 µm. The total amount of colloidal pitch in suspension has been reported to lie in the range of 5–70 ppm (by volume) for pulps at 1% fiber consistency.

Pitch is harmless if removed properly from the papermaking system by either washing the pitch to the sewer, or removing it with the sheet as microscopic particles. However, if the pitch is allowed to concentrate in a system, agglomeration begins, sheet defects and build-up on equipment ensue, and lost or downgraded production are the end result of not properly managing pitch that enters the papermaking system with the pulp.

One concern in the manufacture of paper is the removal of depositable pitch. Several mechanisms regarding the prevention of pitch deposition control have been suggested in the past. Three mechanisms that are commonly proposed to explain the phenomena of pitch deposition control are outlined below:

(1) a cationic polymer used for pitch control adsorbs onto the anionic pitch particles, and these "stabilized" pitch particles become "fixed" onto the fibers, thus reducing the concentration of "free" pitch particles in the process water;

(2) cationic polymers or talc are thought to act as a dispersed pitch stabilizer by adsorbing on the pitch particles and rendering them non-sticky; and (3) consecutive treatment of machine parts with cationic and nonionic polymers renders them hydrophilic by forming a steric barrier to overcome Van der Waal's attraction forces.

The third mechanism not only inhibits pitch deposition, but also gives deposits which are easy to wash away.

Surface charge neutralization of colloidal pitch in the papermaking process water suspension can be enhanced by the use of a coagulant of polydiallyldimethyl ammonium chloride (DADMAC) which has been modified to incorporate a certain degree of hydrophobic nature.

Poly(DADMAC) was found by the present inventors to be active at the pitch particle/water interface, but not active at the air/water interface. The polymer brings about coalescence of the pitch particles such that they attain a size which enables them to be caught in the matrix of the pulp fibers. The increased size facilitates them being carried along with the pulp during the papermaking process much like the process of filtration. Contact angle measurements indicate that the polymers also have a tendency to adsorb on the solid surfaces rendering them hydrophilic. The hydrophilic nature of the surface inhibits the deposition of pitch particles on them.

Based upon the inventors' investigation of poly(DAD-MAC) it was discovered that a cationic polymer that had the ability to get to the pitch/water interface and simultaneously adsorb on hydrophobic surfaces (like Teflon®) would be effective in controlling the deposition of pitch. Contact angle measurements showed that poly(DADMAC) was not very effective in adsorbing onto hydrophobic surfaces.

The present inventors have synthesized a novel polyelectrolyte copolymer incorporating a silicon moiety onto the backbone of a polyelectroyte such as poly(DADMAC). This unique cationic and surface active polymer is advantageous over conventional polymers especially poly(DADMAC) because of its increased surface activity, as evidenced by the lowering of the surface tension, as well as its adsorption onto hydrophobic surfaces. Both of the aforementioned properties of this novel polymer facilitate its ability to inhibit pitch deposition during the papermaking process by adsorbing on surfaces and causing the pitch particles to attain a size so that they can be carried along with the paper.

U.S. Pat. No. 5,246,547 (Finck et al.), which issued on Sep. 21, 1993, discloses a hydrophobically modified polyelectrolyte which has been used for controlling pitch. This hydrophobically modified polyelectrolyte is formed by the copolymerization of DADMAC with a hydrophobically modified monomer, such as, dimethylaminoethyl (meth)acrylate benzyl chloride quaternary, dimethylaminoethyl (meth)acrylate cetyl chloride quaternary, and dimethylaminoethyl (meth)acrylate methyl chloride quaternary.

The present inventors have uncovered that the use of a silicon moiety in place of the hydrophobically modified monomers disclosed in U.S. Pat. No. 5,246,547 results in the following advantages: (1) silicon monomers are capable of forming networks with other silicon monomers similar to crosslinking; and (2) silicon monomers are capable of adhering or adsorbing to hydrophobic surfaces even at very low levels.

The present invention also provides many additional advantages which shall become apparent as described below.

SUMMARY OF THE INVENTION

The water-soluble, silicon-containing polyelectrolyte copolymer coagulant preferably comprises diallyldimethyl ammonium chloride and a vinyl alkoxysilane.

This water-soluble, silicon-containing polyelectrolyte copolymer is preferably used as a coagulant to control pitch in papermaking systems. As such, this unique water-soluble, silicon-containing polyelectrolyte copolymer coagulant is added to pulp and paper process water in an amount between about 0.4 to about 4 pounds per ton of dry pulp.

Other and further objects, advantages and features of the present invention will be understood by reference to the following specification in conjunction with the annexed drawings.

DESCRIPTION OF THE PREFERRED EMBODIMENTS

The water-soluble, silicon-containing polyelectrolyte copolymer coagulant preferably comprises diallyldimethyl ammonium chloride and a vinyl alkoxysilane. The first monomer and vinyl siloxane monomer are preferably present in a molar ratio in the range between about 99.99:0.01 to about 90:10.

The vinyl alkoxysilane monomer is reacted with a second monomer in accordance with the reaction below wherein, for example, an aqueous solution of diallyldimethyl ammonium chloride (DADMAC) monomer is reacted with vinyl trimethoxysilane (VTMS) in the presence of an initiator at a temperature in the range between about 45° C. to about 82° C.:

-continued

The polymer initiator is preferably selected from the group consisting of: 2,2'-azobis(2-amidinopropane) hydrochloride (V50), 2,2'-azobis(N,N'-dimethyleneisobutyramidine)dihydrochloride (VA-044), ammonium persulfate, and ammonium persulfate/sodium meta bisulfite.

A method for controlling pitch in papermaking systems which comprises the step of adding a surface active polyelectrolyte polymer coagulant to the pulp and paper process water wherein the polymer comprises from 0.01 to 20 mole percent of:

A. vinyl alkoxysilane monomer capable of radical polymerization; and

B. from 80 to 99.99 mole percent of a monomer selected from the group consisting of acrylamide, acrylic acid and its alkali metal salts, dimethylaminoethyl (propyl) acrylate methyl chloride quaternary, diallyldimethyl ammonium chloride, maleimide, vinyl formamide, vinyl acetate, iraconic acid, maleic anhydride, fumaric acid, aconic acid, acrylamido methyl propane sulfonic acid and its alkali metal salts, $C_6-C_{20}$ alkyl esters of acrylic acid, aryl alkyl esters of acrylic acid such as phenethyl acrylate, nonyl-α-phenyl acrylate, benzyl acrylate, dimethyl acrylamide, diethyl acrylamide, tert-butyl acrylamide, dimethylaminoethylacrylate benzyl chloride quaternary, 3-methylacrylamide propyl trimethyl ammonium chloride, acrylamidomethyl butanoic acid and combinations thereof. The vinyl alkoxysilane monomer is one which is capable of radical polymerization. Preferably, the vinyl monomer is selected from the group consisting of vinyl trimethoxysilane and vinyl triethoxysilane. Most preferably, the polymer comprises vinyl trimethoxysilane and diallyldimethylammonium chloride. The reduced specific viscosity of the water-soluble, silicon-containing polyelectrolyte polymer in one molar sodium nitrate solution for one percent polymer actives is from 0.1 to 4 dl/gm. Preferably, the reduced specific viscosity of the water-soluble, silicon-containing polyelectrolyte polymer in one molar sodium nitrate solution for one percent polymer actives is from 0.5 to 3 dl/gm. Most preferably, the reduced specific viscosity of the water-soluble, silicon-containing polyelectrolyte polymer in one molar sodium nitrate solution for one percent polymer actives is from 0.8 to 2.5 dl/gm. The mole ratio of diallyldimethyl ammonium chloride to vinyl trimethoxysilane ranges from 99.9:0.01 to 85:15. Preferably, the mole ratio of diallyldimethyl ammonium chloride to vinyl trimethoxy silane ranges from 99.9:0.01 to 95.0:5.0.

This unique water-soluble silicon-containing polyelectrolyte copolymer has been demonstrated in the examples below to act as an effective coagulant in controlling pitch in papermaking systems. The water-soluble, silcion-containing polyelectrolyte copolymer coagulant is preferably added to the pulp and paper process water in an amount between about 0.4 to about 4 pounds per ton of dry pulp, more preferably 0.4 to 2.0 pounds per ton of dry pulp. The polymer may be added during the pulp washing stage such as in a brown stock washer of a pulp mill as well as in bleach plant extraction stage washers.

EXAMPLE 1

A pulp slurry was prepared using a dry lap hardwood kraft paper. Pieces of the paper were soaked in water for 30 minutes, followed by treatment in a hydrapulper for 35 minutes. The entire batch was then added to a Valley beater with enough water to form a 2.5% pulp solution by weight. The pulp was treated in the beater for 35 minutes.

The composition of the synthetic pitch used for this example was as follows:

| Chemical | % Composition |
|---|---|
| Abietic Acid | 50 |
| Oleic Acid | 10 |
| Palmitic Acid | 10 |
| Oleic Acid, triglyceride ester(corn oil) | 10 |
| Methyl Stearate | 5 |

-continued

| Chemical | % Composition |
| --- | --- |
| β-Sitosterol | 5 |
| Cholesterol Caproate | 5 |
| Oleyl Alcohol | 5 |

The Wilhelmy plate technique, using the KRUSS K10T tensiometer, was used to make surface and interfacial tension measurements. The instrument measures the force required to pull a platinum plate from an air/liquid or a liquid/liquid interface. The technique also allows for the measurement of the change in surface tension as a function of time. The plate was cleaned using acetone, methyl alcohol, and deionized water prior to heating using a propane torch. The glass cells used for surface tension measurements were first cleaned with a dilute soap solution, acetone and methyl alcohol, and then immersed in aqua-regia overnight. The cell was then thoroughly rinsed in deionized water. A water jacket, in which the cell is placed, facilitates the maintenance of a constant temperature. Change in interfacial/surface tension was monitored continuously as a function of time.

One gram of synthetic pitch was taken in a 250 ml beaker and heated until the melting point of the pitch was reached. 49 grams of a 0.5% NaOH solution was poured into the beaker and the system was stirred. Known amounts of this solution were added to 100 ml of water, and the pH was adjusted to 6.5 using a dilute HCl solution. The water containing the pitch was stirred for 2 minutes using a 25 mm stir bar. 25 ml of this system was then placed in the test cell for surface tension measurements. 1% polymer solution was prepared in water. A Hamilton microsyringe was used to add polymer to the system. In cases where the polymer was added to the solution containing pitch, the system was stirred for 2 minutes using a 15 mm stir bar.

Surface tension measurements are commonly used to monitor the process of adsorption of a surfactant or polymer to an interface. As the surfactant orients itself at the interface it will lower the surface tension of the system. The Wilhelmy plate that is positioned at the interface senses this change in tension (or pressure) hence allowing for continuous monitoring of the adsorption process. The surface tension measurements were made to determine the interaction between the polymer and the individual pitch particles. The surface tension of water which is typically 72 mN/m did not change on addition of poly(DADMAC). This proved that the polymer was not active at the air/water interface.

Figure 2:
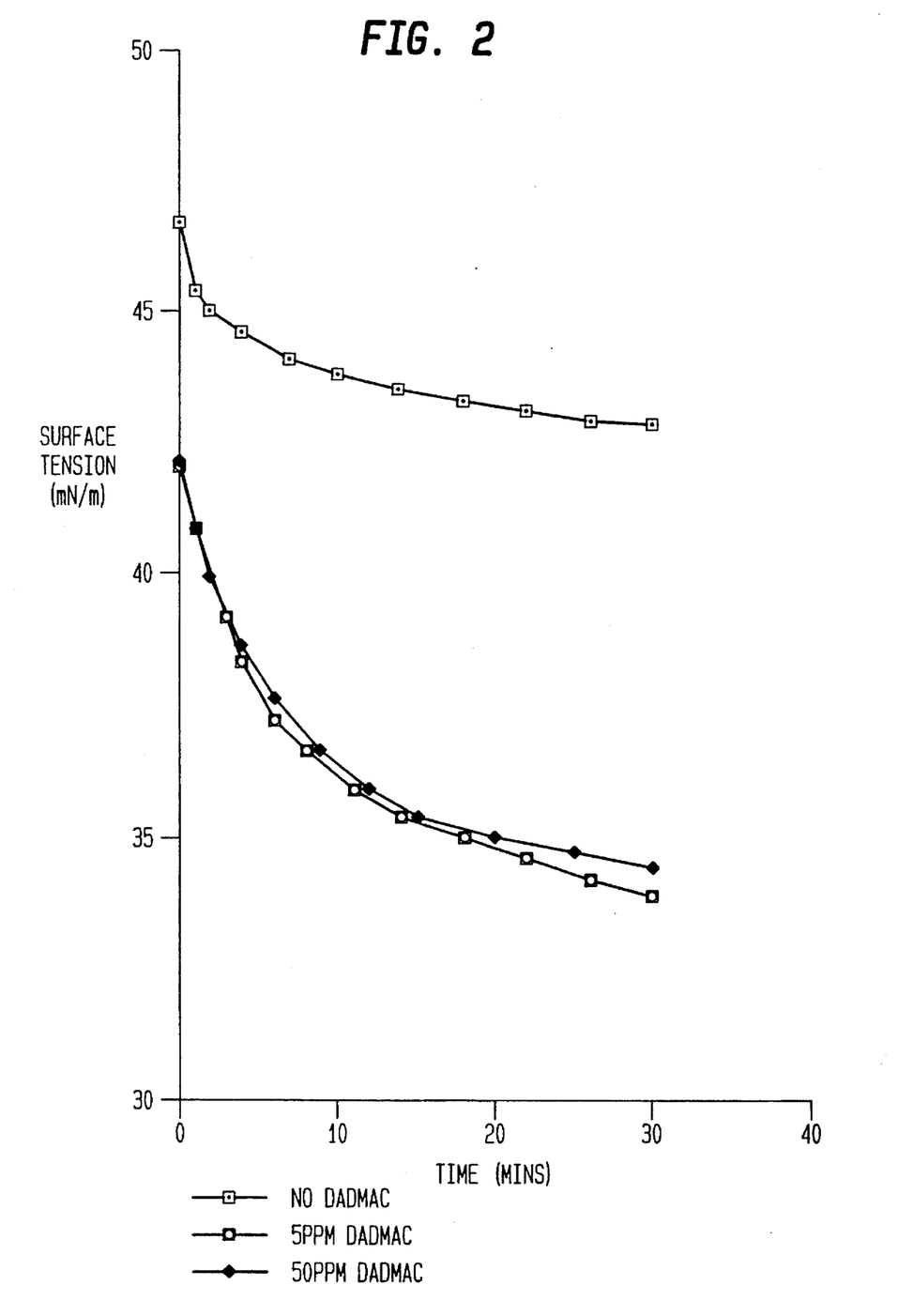
FIG. 2 is a graph plotting surface tension versus time for polyDADMAC with 500 ppm pitch at a pH of 6.5.
Figure 3:
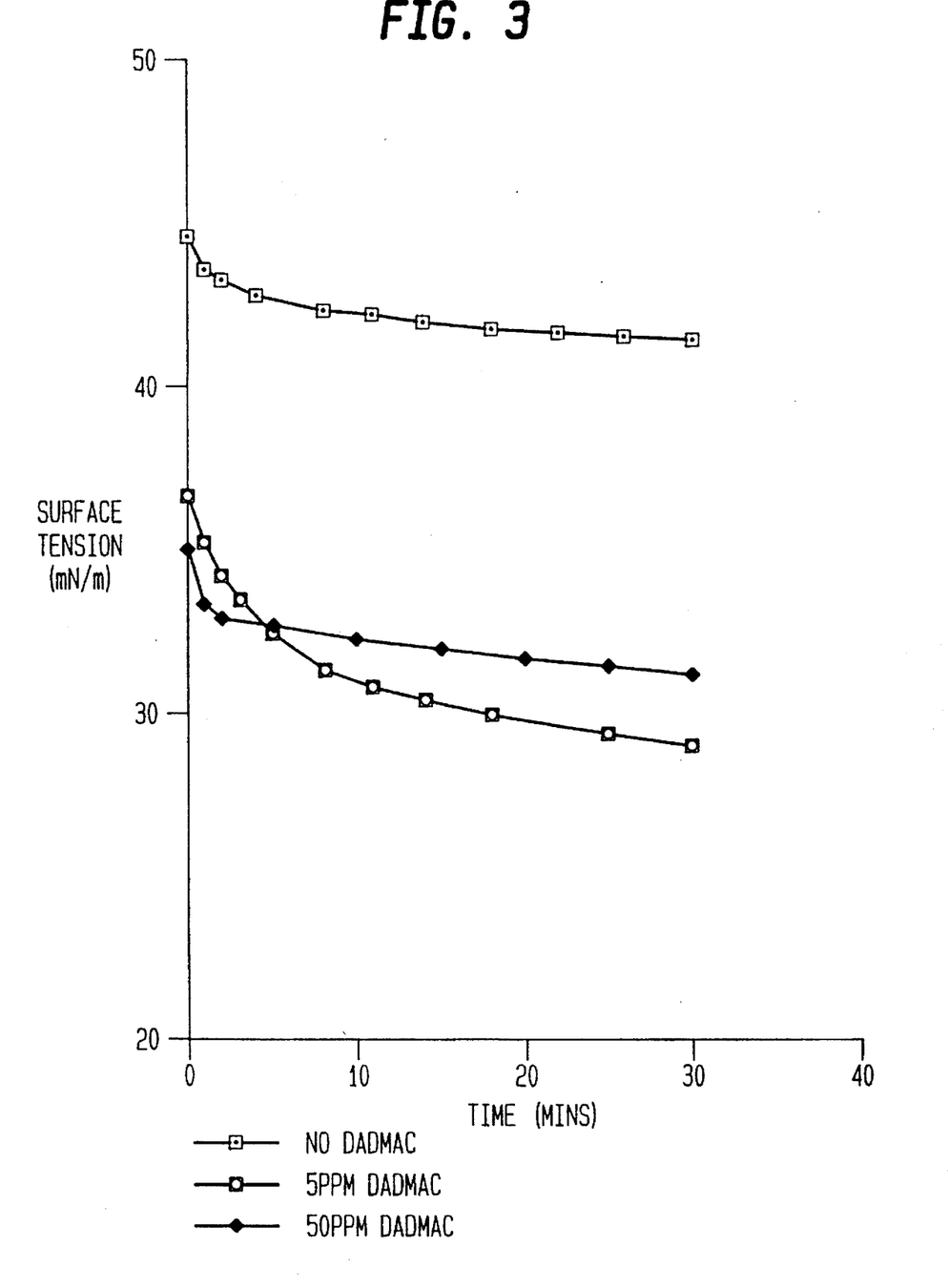
FIG. 3 is a graph plotting surface tension versus time for polyDADMAC with 1,000 ppm pitch at a pH of 6.5.
Figure 4:
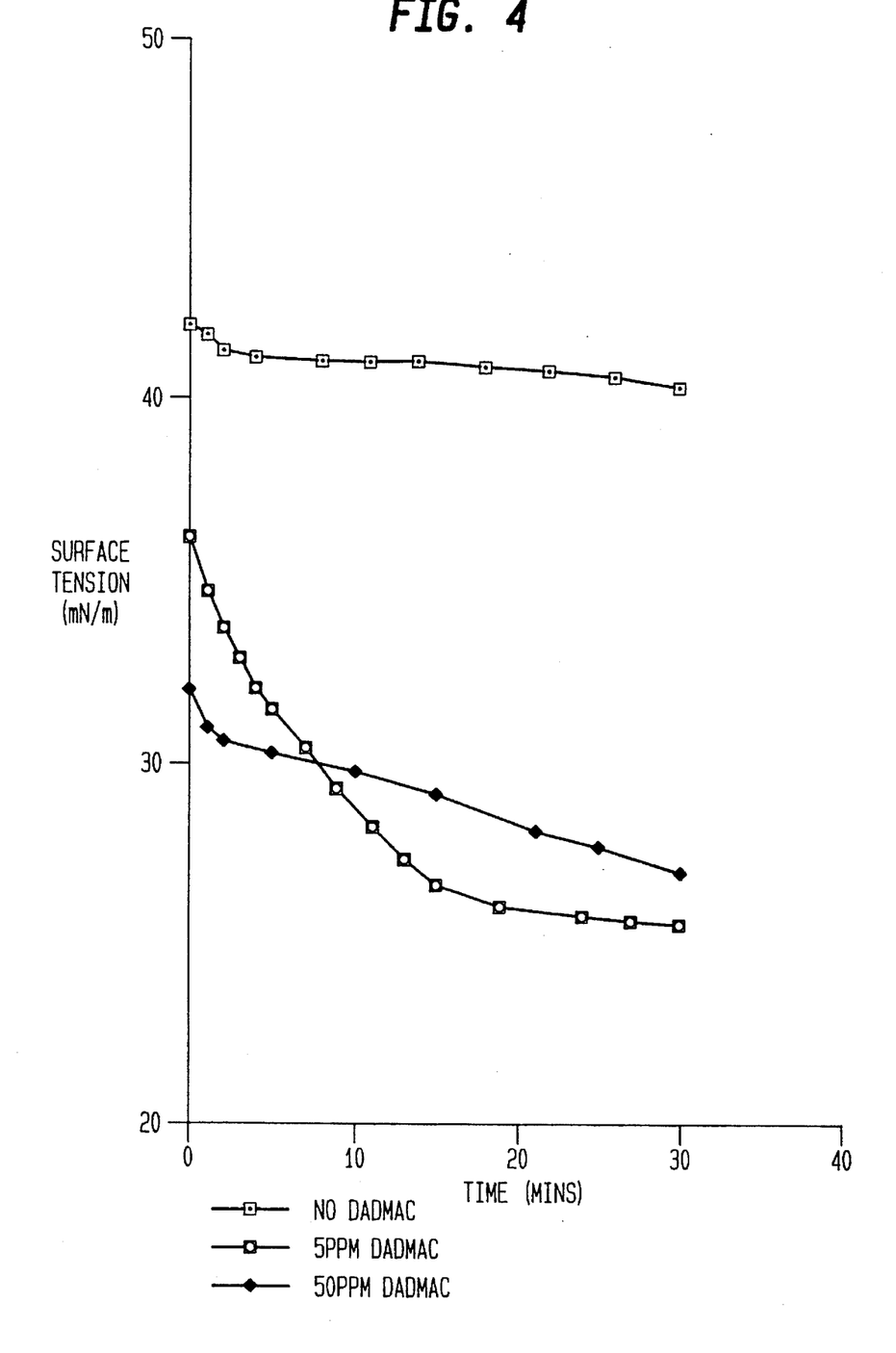
FIG. 4 is a graph plotting surface tension versus time for polyDADMAC with 1,500 ppm pitch at a pH of 6.5.

FIGS. 2, 3 and 4 show the change in the surface tension when synthetic pitch is added to water both with and without poly(DADMAC). Since pitch can be considered to be a dilute oil-in-water emulsion stabilized by surfactants, the reduction in surface emulsion stabilized by surfactants, and the reduction in surface tension of the system may be attributed to the adsorption of free surfactant at the air/water (a/w) interface. The value of the surface tension will depend on the amount of pitch, and hence the amount of surfactant in the system. On addition of polymer to the system, the surface tension is lowered further (see FIGS. 2, 3, and 4) in comparison to the base line curve for pitch alone. The reduction in surface tension implies that more surfactant is available to be absorbed at the a/w interface. For a given concentration of pitch it can be assumed that the amount of surfactant will be fixed. Hence the surfactant should have been released from the surface of the oil droplets that it is stabilizing. This can happen only if the surface area available for surfactant adsorption is reduced, releasing more free surfactant to get to the a/w interface and if the surfactant is replaced by the polymer on the surface of the pitch particle. A similar trend is seen at various concentrations of pitch and polymer. Hence it may be concluded that the polymer is bringing about the coalescence of the oil droplets in the dilute oil-in-water emulsion.

Interfacial tension measurements were made to determine whether the polymer was active at the oil/water interface. For lack of a better substitute corn oil was used to represent the oil phase of the oil-in-water emulsion containing pitch. The equilibrium interfacial tension between corn oil and deionized water was found to be 25.2 mN/m at 23° C. On addition of 5 ppm of the poly(DADMAC) to water the interfacial tension was reduced to 21 mN/m, and to 20 mN/m at 50 ppm polymer, thus proving that the polymer is active at the oil/water interface.

Based on surface tension measurements and photomicrographic studies conducted by the present inventors, it was concluded that the poly(DADMAC) brought about the coalescence of pitch particles to a size such that the particles can be caught in the matrix of the pulp fibers and be carried along with the paper much like the process of filtration.

Contact angle measurements were made to determine whether the poly(DADMAC) had a tendency to adsorb on the surface under consideration. The process of drying during these measurements was essential to make any kind of reasonably reproducible measurements.

Figure 1:
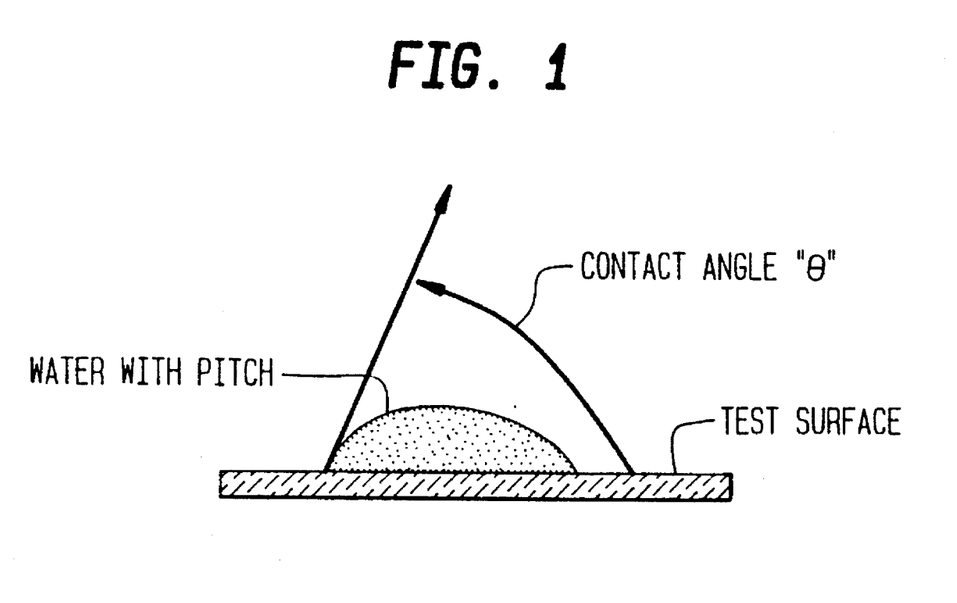
FIG. 1 is a schematic diagram showing the measurement of the contact angle on a test surface.

A KRUSS G-123 Contact Angle Meter was used to measure the change in the contact angle made by water containing pitch on surfaces like Teflon®, stainless steel 316 and stainless steel 304, as a function of time (see FIG. 1). The surface used for the study was first cleaned using acetone and methyl alcohol, and flushed with deionized water. The test surface was then immersed in a beaker containing water with a known amount of polymer for 5 minutes. The contents of the beaker were stirred continuously. The test surface was then dried, and the change in the contact angle of a drop of water containing pitch particles was measured. A drop of uniform size was obtained by using a micrometer driven precision syringe.

Table 1 below shows the change in the three phase contact angle of a drop of water containing pitch particles on a Teflon® surface.

TABLE 1

| Time (minutes) | Contact Angle "θ" | Test Condition |
| --- | --- | --- |
| 0 | 80 | Treated |
| 10 | 46 | Treated |
| 0 | 110 | Untreated |
| 10 | 85 | Untreated |

The untreated surface is hydrophobic as seen from the contact angle which is as high as 110°. This angle changes to approximately 85° in 10 minutes. On the other hand, the contact angle of the same drop on a surface treated with polymer changes from 80° to 46° in 10 minutes. This change implies that the surface is being rendered hydrophilic by the adsorption of polymer onto the Teflon® surface in the five minutes that the surface is in contact with the polymer. This explains the variability in the contact angle measurements on the Teflon® surface at various locations.

The poly(DADMAC) was found to be active at the pitch particle/water interface. Poly(DADMAC) is not active at the air/water interface. Contact angle measurements indicated that the polymers also have a tendency to adsorb on the solid surfaces rendering them hydrophilic. The hydrophilic nature of the surface inhibits the deposition of pitch particles on them.

EXAMPLE 2

A 90/10 mole % copolymer of diallyldimethylammonium chloride (DADMAC) and vinyl trimethoxysilane (VTMS), at 20% actives, was prepared for use as a coagulant in controlling pitch in a pulp and paper wastewater process stream. The following reactants were used to form the hydrophobic polyelectrolyte copolymer coagulant:

| | |
|---|---|
| 312.91 grams | DADMAC (a 58% Solution) |
| 18.89 grams | VTMS (a 98% Solution) |
| 646.40 grams | Deionized Water |
| 1.80 grams | V50 initiator |
| 20.0 grams | NaCl |

The DADMAC, NaCl and deionized water were charged into a polymerization reactor at a temperature of about 52° C. Thereafter, the VTMS was charged into the reactor dropwise via a syringe pump at 4.5 cc/hour. Then the V50 (1.2 grams in 48.8 grams of deionized water) was charged into the reactor dropwise via a syringe pump at 12.5 cc/hour.

A thick polymer started forming after about 2 hours. At the end of two and a half hours, the agitation reached the maximum torque. 200 ml of deionized water was then added such that the torque reduced to 2920 dynes.cm. The reaction continued for a period of 5 hours, and then subjected to a post treatment at 82° C. for 5 hours.

Product phase separated in two days and indicated extensive crosslinking as shown below:

where R is a methyl.

EXAMPLE 3

A 99.5/0.5 mole % copolymer of diallyldimethylammonium chloride (DADMAC) and vinyl trimethoxy silane (VTMS), at 20% actives, was prepared for use as a coagulant in controlling pitch in a pulp and paper wastewater process stream. The following reactants were used to form the water-soluble, silicon-containing polyelectrolyte copolymer coagulant:

| | |
|---|---|
| 321.13 grams | DADMAC (a 62% Solution) |
| 1.00 grams | VTMS (a 98% Solution) |
| 258.80 grams | Deionized Water |
| 1.20 grams | VA-044 Initiator |
| 61.00 grams | NaCl |
| 356.87 | Dilution Water |

The DADMAC, VTMS, NaCl and deionized water were charged into a polymerization reactor at a temperature of 58° C. Thereafter, the VA-044 (0.6 grams in 49.4 grams deionized water) was charged into the reactor dropwise via a syringe pump at 12.5 cc/hour.

A thick polymer started forming after about 1.0 hour. At the end of 1.5 hours, the agitation reached the maximum torque. At this point, deionized water addition was started using a syringe pump set at 70 ml/hour. The reaction continued for a period of 5.5 hours. After that, VA-044 (0.6 grams in 19.4 grams of deionized water) was added. The reactor was heated to 82° C. and held at that temperature for 3 hours. The reaction product was then diluted with 356.87 grams of water and stored. RSV/IV measurements were made for a 1% polymer solution in 1 m NaNO$_3$ and found to be 2.02/1.3 dl/gm.

EXAMPLE 4

A series of stainless steel 316 coupons were immersed in varying dosages of a polymer solution of poly(DADMAC). A second series of coupons were then immersed in varying dosages of a polymer solution of DADMAC/VTMS having a molar ratio of 99.5:0.5. Each coupon was left in its respective solution for approximately 18 hours. The comparative efficiencies of the two polymers in inhibiting pitch deposition are set forth below in table 2 and FIG. 5, attached hereto.

TABLE 2

Figure 5:
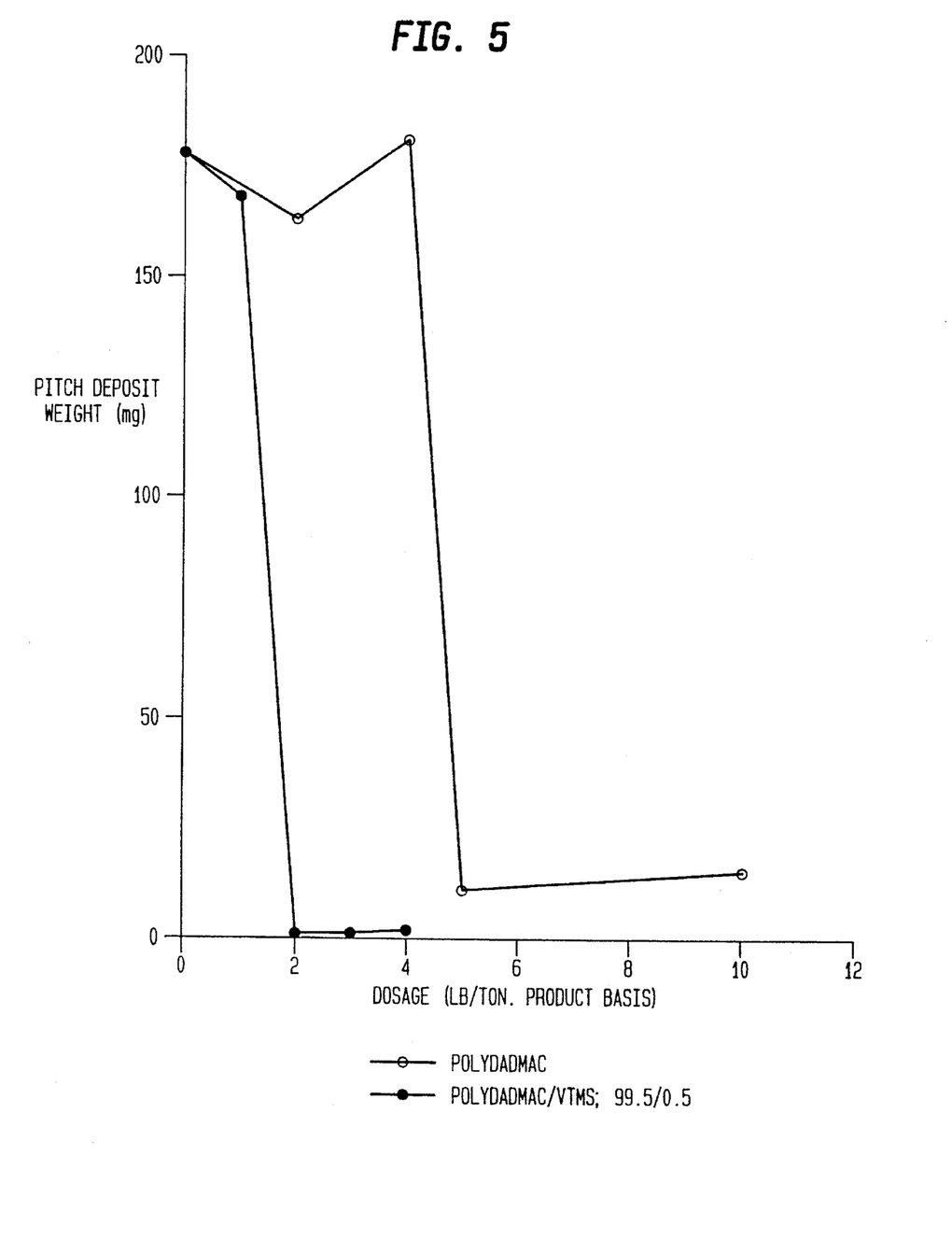
FIG. 5 is a graph plotting pitch deposit weight versus dosage for both polyDADMAC and polyDADMAC/VTMS (99.5/0.5)

| Polymer Composition | W Initial (grams) | W Final (grams) | pH Adj. | pH Final | Conc. (ml) | Pitch Dosage (lb/ton) | AW (grams) |
|---|---|---|---|---|---|---|---|
| Blank | 11.9115 | 12.0486 | 6.55 | 5.73 | 150 | 0 | 0.1371 |
| DADMAC | 11.0420 | 11.2052 | 6.83 | 5.70 | 150 | 2 pdct. | 0.1632 |
| DADMAC | 11.3185 | 11.7387 | 7.3 | 6.91 | 150 | 3 | 0.4202 |
| DADMAC | 11.2950 | 11.4769 | 7.42 | 6.23 | 150 | 4 | 0.1819 |
| DADMAC | 10.7239 | 10.7352 | 7.27 | 5.87 | 150 | 5 | 0.0113 |
| DADMAC | 11.2986 | 11.3136 | 7.2 | 5.92 | 150 | 10 | 0.0150 |
| DADMAC/VTMS | 11.2916 | 11.4597 | 7.16 | 5.83 | 150 | 1 | 0.1681 |
| DADMAC/VTMS | 10.7198 | 10.7109 | 6.36 | 5.52 | 150 | 2 | ~0.00 |
| DADMAC/VTMS | 10.6431 | 10.6368 | 6.03 | 5.55 | 150 | 3 | ~0.00 |
| DADMAC/VTMS | 10.7013 | 10.7169 | 7.05 | 6.32 | 150 | 4 | 0.0156 |

Notes: W denotes weight of the coupon.

The polyDADMAC/VTMS copolymer exhibited far greater ability to adsorb onto the hydrophobic surfaces than the DADMAC polymer. The polyDADMAC/VTMS copolymer was also capable of causing an increase in particle size to a level such that it can be caught within the fibers.

EXAMPLE 5

Surface tension is commonly used as a simple tool to determine whether a molecule dissolved in water or any other solvent is active at the air water (a/w) interface. The surface tension of deionized, distilled water is typically 72 mN/m at 23° C. A molecule is considered to be surface active at the a/w interface if it is able to diffuse to the a/w interface and lower the surface tension of water from 72 mN/m. The greater the reduction of the surface tension for a given change in surfactant concentration, the greater is the surface activity of the molecule.

When surfactants are added to water they will typically lower the surface tension of the water (see W. C. Preston, J. Phys. Colloid Chem. 52, 84 (1948)). As the concentration of the surfactant dissolved in water is increased, the surface tension is lowered until a point where any further increase in surfactant concentration has no effect on the surface tension of the system. The concentration at which this phenomena occurs is called the critical micelle concentration or CMC. At CMC the surfactants are known to form aggregates called micelles. These micelles are formed due to the association of individual surfactant molecules to form spherical, ellipsoidal or cylindrical aggregates. The micelles are in a state of dynamic equilibrium. It is the ability of the surfactants to form micelles that are primarily responsible for various desirable properties of surfactants like emulsification, demulsification, adsorption, foaming, solubilization and detergency.

Figure 6:
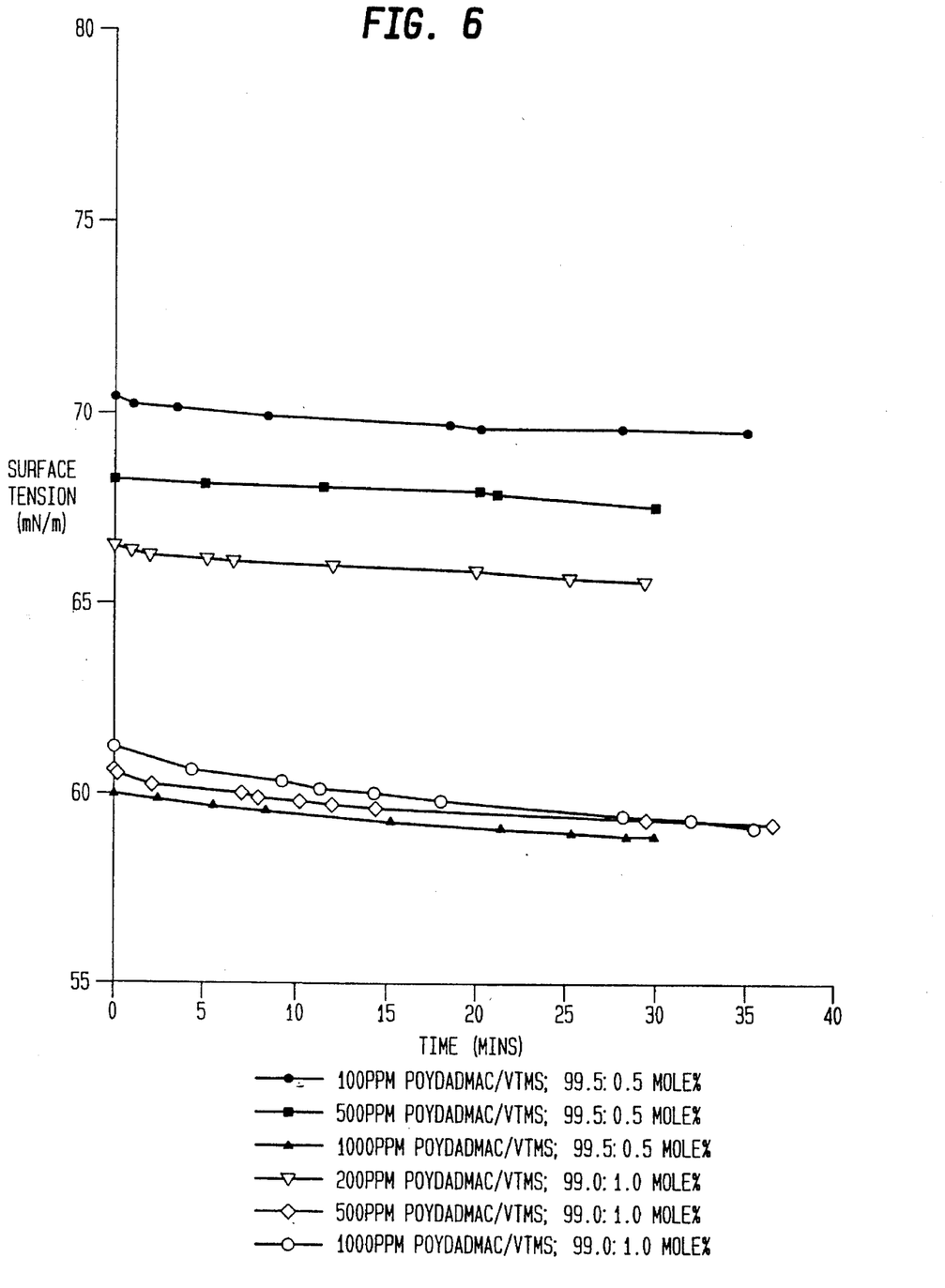
FIG. 6 is a graph plotting surface tension versus time for both polyDADMAC/VTMS (99.5/0.5) and polyDADMAC/VTMS (99/1).

PolyDADMAC when dissolved in water does not lower its surface tension. Hence one can conclude that it is not active at the a/w interface. The polyDADMAC/VTMS molecules, however, lower the surface tension of water at concentrations as low as 100 ppm (see FIG. 6). The higher the concentration of the polymer in the water, the lower the surface tension. Unlike surfactants these polymers do not show any evidence of the formation of micelles. The surface tension versus concentration curves do not show a sharp inflexion point as shown by surfactants.

The surface active nature of the modified polyDADMAC molecule facilitates its ability to adsorb on surfaces and interfaces making it more effective (i.e., efficient) in various applications like pitch removal, water clarification, color removal etc.

Alternatively, the silicon moiety can be incorporated onto the polyelectrolyte by reacting, for example, an amine and a halo silane.

While we have shown and described several embodiments in accordance with our invention, it is to be clearly understood that the same are susceptible to numerous changes apparent to one skilled in the art. Therefore, we do not wish to be limited to the details shown and described but intend to show all changes and modifications which come within the scope of the appended claims.

What is claimed is:

1. A method for controlling pitch in papermaking systems which comprises the step of adding a water-soluble, surface active, silicon-containing polyelectrolyte polymer coagulant to the pulp and paper process water in an amount between 0.4 to 4 pounds per ton of dry pulp wherein the polymer made by free radical polymerization comprises:

A. from 0.01 to 20 mole percent of a vinyl alkoxysilane monomer; and

B. from 80 to 99.99 mole percent of, diallyldimethyl ammonium chloride monomer wherein said silicon-containing polyelectrolyte polymer has a reduced specific viscosity in one molar sodium nitrate solution for one per cent polymer actives of at least 0.1 dl/gm.

2. The method of claim 1 wherein the vinyl alkoxysilane monomer is selected from the group consisting of vinyl trimethoxysilane and vinyl triethoxysilane.

3. The method of claim 2 wherein the polymer comprises vinyl trimethoxysilane and diallyldimethylammonium chloride.

4. The method of claim 3 wherein the reduced specific viscosity of the water-soluble, surface active, silicon-containing polyelectrolyte polymer in one molar sodium nitrate solution for one percent polymer actives is from 0.1 to 4 dl/gm.

5. The method of claim 3 wherein the reduced specific viscosity of the water-soluble, surface active, silicon-containing polyelectrolyte polymer in one molar sodium nitrate solution for one percent polymer actives is from 0.5 to 3 dl/gm.

6. The method of claim 3 wherein the reduced specific viscosity of the water-soluble, surface active, silicon-containing polyelectrolyte polymer in one molar sodium nitrate solution for one percent polymer actives is from 0.8 to 2.5 dl/gm.

7. The method of claim 3 wherein the mole ratio of diallyldimethyl ammonium chloride to vinyl trimethoxysilane ranges from 99.9:0.01 to 85:15.

8. The method of claim 3 wherein the mole ratio of diallyldimethyl ammonium chloride to vinyl trimethoxysilane ranges from 99.9:0.01 to 95.0:5.0.

\* \* \* \* \*

UNITED STATES PATENT AND TRADEMARK OFFICE
CERTIFICATE OF CORRECTION

PATENT NO. : 5,527,431
DATED : JUNE 18, 1996
INVENTOR(S) : CHANDRASHEKAR S. SHETTY & MANIAN RAMESH

It is certified that error appears in the above-indentified patent and that said Letters Patent is hereby corrected as shown below:

Column 9 structure should be as shown:

IN COLUMN 9, LINE 41, DELETE: where R is a methyl.

UNITED STATES PATENT AND TRADEMARK OFFICE
CERTIFICATE OF CORRECTION

PATENT NO. : 5,527,431

DATED : JUNE 18, 1996

INVENTOR(S) : CHANDRASHEKAR S. SHETTY & MANIAN RAMESH

It is certified that error appears in the above-identified patent and that said Letters Patent is hereby corrected as shown below:

COLUMN 11, LINE 14-15
lower the surface tension of the water (see W. C. Preston, J. Phys. Colloid Chem. 52, 84 (1948).

SHOULD READ AS:

(See Surfactant Science and Technology, D. Meyers, 1988, VCH Pub. Inc., p. 194

COLUMN 12, LINE 14, CLAIM 1

B. from 80 to 99.99 mole percent of, diallyldimethyl

SHOULD READ AS:

B. from 80 to 99.99 mole percent of _ diallyldimethyl

UNITED STATES PATENT AND TRADEMARK OFFICE
CERTIFICATE OF CORRECTION

PATENT NO. : 5,527,431
DATED : JUNE 18, 1996
INVENTOR(S) : CHANDRASHEKAR S. SHETTY & MANIAN RAMESH

It is certified that error appears in the above-indentified patent and that said Letters Patent is hereby corrected as shown below:

CLAIM 7, COLUMN 12 LINE 45 lane ranges from 99.9:0.01 to 85:15.

LETTERS PATENT SHOULD READ AS:

lane ranges from 99.9\_9:0.01 to 85:15.

CLAIM 8, COLUMN 12, LINE 48 lane ranges from 99.9:0.01 to 95.0:5.0

LETTERS PATENT SHOULD READ AS:

lane ranges from 99.9\_9:0.01 to 95.0:5.0.

Signed and Sealed this

First Day of October, 1996

Attest:

BRUCE LEHMAN

Attesting Officer

Commissioner of Patents and Trademarks